(12) United States Patent
Yonetomi et al.

(10) Patent No.: US 12,330,059 B2
(45) Date of Patent: Jun. 17, 2025

(54) INFORMATION PROCESSING DEVICE AND IMAGE DISPLAY METHOD

(71) Applicant: Sony Interactive Entertainment Inc., Tokyo (JP)

(72) Inventors: Shoi Yonetomi, Tokyo (JP); Masanori Nomura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 352 days.

(21) Appl. No.: 18/006,764

(22) PCT Filed: Jul. 30, 2021

(86) PCT No.: PCT/JP2021/028337
§ 371 (c)(1),
(2) Date: Jan. 25, 2023

(87) PCT Pub. No.: WO2022/030383
PCT Pub. Date: Feb. 10, 2022

(65) Prior Publication Data
US 2023/0277928 A1  Sep. 7, 2023

(30) Foreign Application Priority Data
Aug. 7, 2020 (JP) .................. 2020-135174

(51) Int. Cl.
*A63F 13/52* (2014.01)
*A63F 13/31* (2014.01)
(Continued)

(52) U.S. Cl.
CPC .............. *A63F 13/52* (2014.09); *A63F 13/31* (2014.09); *G06T 3/40* (2013.01); *G06T 11/60* (2013.01)

(58) Field of Classification Search
CPC .......... A63F 13/20; A63F 13/22; A63F 13/23; A63F 13/235; A63F 13/25; A63F 13/31;
(Continued)

(56) References Cited

U.S. PATENT DOCUMENTS

| 10,406,443 B2 | 9/2019 | Imai |
| 11,109,108 B2 | 8/2021 | Tokunaga |

(Continued)

FOREIGN PATENT DOCUMENTS

| JP | 2016083225 A | 5/2016 |
| JP | 2020093109 A | 6/2020 |
| WO | 2013111247 A1 | 8/2013 |

OTHER PUBLICATIONS

International Search Report for corresponding PCT Application No. PCT/JP2021/028337, 4 pages, dated Oct. 19, 2021.

(Continued)

*Primary Examiner* — Omkar A Deodhar
(74) *Attorney, Agent, or Firm* — Kilpatrick Townsend & Stockton LLP

(57) ABSTRACT

An acquisition section acquires first image data from another information processing device. A display processing section displays a first image corresponding to the first image acquired by the acquisition section. An acceptance section accepts operation information of an input device for operating a first information processing device when the first image is displayed. A system image generation section generates second image data corresponding to the operation information accepted by the acceptance section. The display processing section reduces the first image and displays a second image corresponding to the second image data in a manner superimposed on the reduced first image.

6 Claims, 17 Drawing Sheets

(51) Int. Cl.
*G06T 3/40* (2006.01)
*G06T 11/60* (2006.01)

(58) Field of Classification Search
CPC .... A63F 13/327; A63F 13/332; A63F 13/335; A63F 13/45; A63F 13/48; A63F 13/52; A63F 13/537; A63F 13/70
See application file for complete search history.

(56) References Cited

U.S. PATENT DOCUMENTS

| | | | |
|---|---|---|---|
| 2012/0084713 A1 | 4/2012 | Desai et al. | |
| 2013/0303281 A1* | 11/2013 | Argiro | A63F 13/219 463/31 |
| 2014/0349753 A1 | 11/2014 | Imai | |
| 2015/0251095 A1* | 9/2015 | Perrin | G06F 3/048 463/31 |
| 2016/0256774 A1* | 9/2016 | Oshima | A63F 13/40 |
| 2017/0289633 A1 | 10/2017 | Tokunaga | |
| 2019/0282895 A1* | 9/2019 | Choudhary | A63F 13/86 |
| 2020/0090453 A1* | 3/2020 | Nelson | A63F 13/235 |
| 2020/0197804 A1 | 6/2020 | Perlman et al. | |
| 2020/0360807 A1* | 11/2020 | Imai | A63F 13/818 |

OTHER PUBLICATIONS

VivoBook E203NA-464G, "Is remote gaming on a mobile notebook like the VivoBook E203NA-464G stable" URL>https://morimorigameblogg.blogspot.com/2017/10/vivobooke203na-464gps4.html, pp. 1-7, Oct. 1, 2017 (for Relevancy see Non-Pat. Lit. #1).
"Control Your PS4 Console from a Windows PC", PS Remote Play, XP093185955, Available online at: https://remoteplay.dl.playstation.net/remoteplay/lang/en/1100007.html, Dec. 27, 2023, 5 pages.
Blain, "Here's How to Set up PS4 Remote Play for PC & Mac", GamesRadar+, XP093185945, Available online at: https://www.gamesradar.com/how-set-ps4-remote-play-pc-mac/, Mar. 27, 2017, 11 pages.
Hoffman, "How to Stream PlayStation 4 Games to Your PC or Mac with Remote Play", How-To-Geek, XP093185954, Apr. 7, 2016, 12 pages.
Zhang, "PS4 Remote Play On PC /w Latency Test—PlayStation 4 System Update 3.50", XP093185941, Apr. 6, 2016, 2 pages.
"PS4 remote playing in a mobile is safe", Morimori Game Blog, Available online at: https://morimorigameblogg.blogspot.com/2017/10/vivobook-e203na-464gps4.html, Oct. 1, 2017, 16 pages.

* cited by examiner

Remote Play

Which do you want to connect to? 156

Bedroom's Console

Second house's Console

4a

INFORMATION PROCESSING DEVICE AND IMAGE DISPLAY METHOD

TECHNICAL FIELD

The present invention relates to a technology that displays an image.

BACKGROUND ART

PTL 1 discloses a technology that allows connection of a user's terminal device to a gaming device located in a user's home via the Internet and login to the gaming device from a remote place. When the terminal device sends user's operation information to the gaming device, the gaming device reflects the operation information in a game progress and generates image data and sound data. The gaming device streams the generated image data and sound data to the terminal device, which makes it possible for the user to play games while staying at a distant location from the gaming device. This play mode is referred to as "Remote Play."

CITATION LIST

Patent Literature

[PTL 1] WO 2013/111247

SUMMARY

Technical Problem

By using a Remote Play mechanism, for example, when a user is back in his or her parents' home, it is possible for the user to operate a gaming device in his or her parents' home, access a gaming device in his or her home, and play a game installed in the gaming device in his or her home. That is, the user can play the game in question in Remote Play mode with no need to install the game in question to the gaming device in his or her parents' home.

In a case where the gaming device in the parents' home and the gaming device in the user's home are of the same type, system screens such as home screens provided by the two gaming devices have the same layout. Accordingly, it is difficult to determine whether the system screen being displayed is provided by the gaming device in the user's home or the gaming device in the user's parents' home. Therefore, it is preferable that an inventive approach be taken to make the user recognize by which gaming device the screen being displayed is provided.

Therefore, it is an object of the present disclosure to provide a technology for allowing one to recognize, during Remote Play, by which of a connection source device or a connection destination device the screen being displayed is provided.

Solution to Problem

In order to solve the above problem, an information processing device of an aspect of the present disclosure is an information processing device operated by a user, including a communication processing section configured to communicatably connect to another information processing device via a network, an acquisition section configured to acquire first image data from the other information processing device, a display processing section configured to display a first image corresponding to the first image data acquired by the acquisition section, an acceptance section configured to accept operation information of an input device for operating the information processing device when the first image is displayed, and an image generation section configured to generate second image data corresponding to the operation information accepted by the acceptance section. The display processing section reduces the first image and displays a second image corresponding to the second image data in a manner superimposed on the reduced first image.

Another aspect of the present disclosure is a method that displays an image on an information processing device, the method including a step of acquiring first image data from another information processing device to which the information processing device communicatably connects via a network, a step of displaying a first image corresponding to the first image data, a step of accepting operation information of an input device for operating the information processing device when the first image is displayed, a step of generating second image data corresponding to the operation information, and a step of reducing the first image and displaying a second image corresponding to the second image data in a manner superimposed on the reduced first image.

It should be noted that arbitrary combinations of the above components and conversions of expressions of the present disclosure between a method, a device, a system, a recording medium, a computer program, and the like are also effective as aspects of the present disclosure.

DESCRIPTION OF EMBODIMENT

Figure 1:
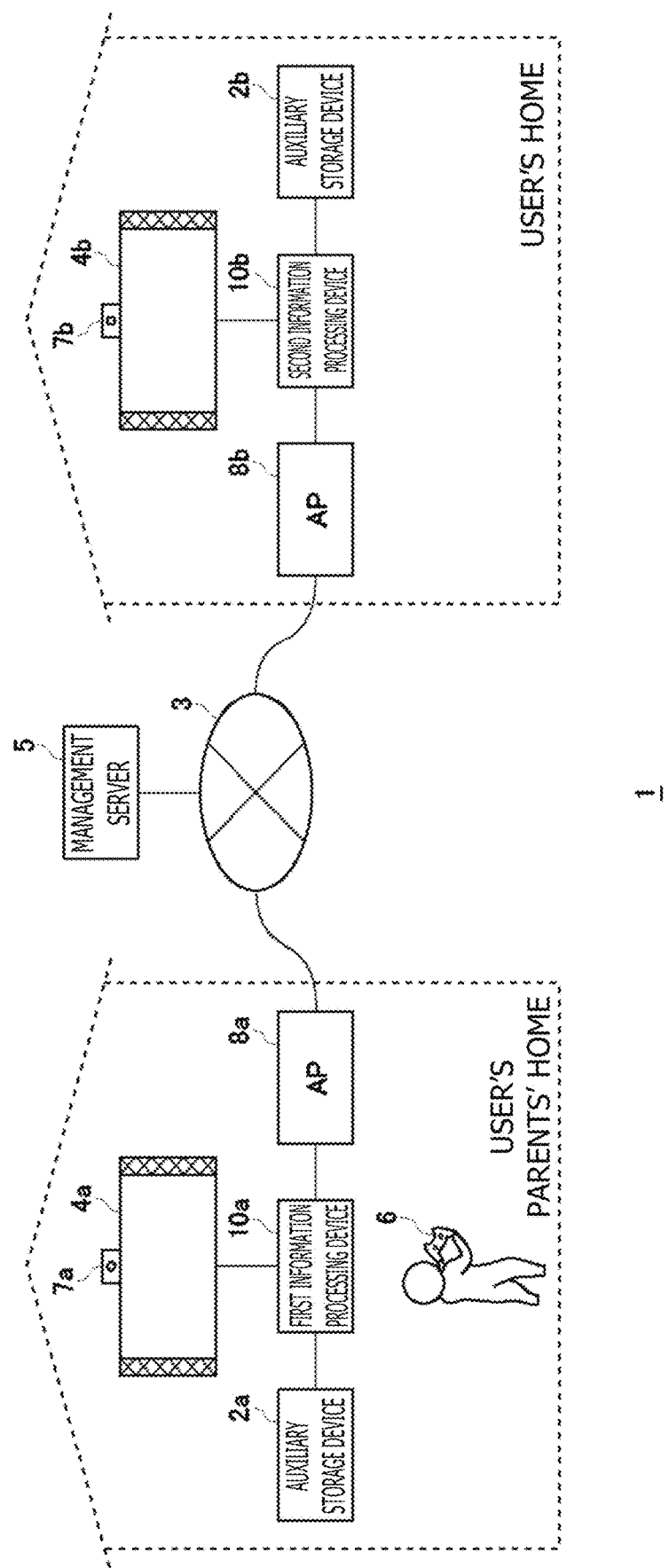
FIG. 1 is a diagram illustrating an aspect of an information processing system of an embodiment.

FIG. 1 illustrates an aspect of an information processing system of an embodiment. In an information processing system 1, a management server 5 provides network services regarding games to a user. The management server 5 manages account information for identifying the user, and the user signs in to network services provided by the management server 5 by using the account information. It should be noted that signing in to the network services may hereafter be referred to also as signing in to the management server 5.

The account information may include a mail address and a password. When the user logs in to the information processing device that holds his or her own account information, the account information is authenticated by the management server 5, which makes it possible for the user to sign in to the management server 5. Here, logging in to an information processing device means that the user can use functions of the information processing device, and user's signing in to the management server 5 means that the user can use network services.

It is possible for the user to store game save data in the management server 5 and register trophies acquired during game play with the management server 5 by signing in to the management server 5. Also, it is possible for the user to perform, by signing in to the management server 5, "Remote Play" in which the user logs in to an information processing device located at a remote place and play games.

The information processing system 1 illustrated in FIG. 1 illustrates an aspect of usage when the user is back in his or her parents' home. A first information processing device 10a is provided in the user's parents' home, and a second information processing device 10b is provided in the user's home. By using the Remote Play mechanism, it is possible for the user to access the second information processing device 10b in his or her home from the first information processing device 10a in his or her parents' home and to play games installed in the second information processing device 10b. During Remote Play, the first information processing device 10a which is a connection source and the second information processing device 10b which is a connection destination may connect to each other through P2P (Peer-to-Peer) communication via a network 3 such as the Internet.

The first information processing device 10a wirelessly or wiredly connects to an input device 6 operated by the user. When operation information is accepted from the input device 6 in normal play mode, the first information processing device 10a reflects the operation information in processing of system software and application software and causes an output device 4a to output processing results. In the embodiment, the first information processing device 10a is a gaming device that executes applications such as games, and the input device 6 is a game controller and supplies user's operation information to the first information processing device 10a.

An auxiliary storage device 2a is a large-capacity storage device such as an HDD (hard disk drive) or an SSD (solid-state drive) and may be a built-in storage device or an external storage device that connects to the first information processing device 10a by using a USB (Universal Serial Bus) or the like. The output device 4a may be a television set that has a display that outputs images and a speaker that outputs sounds. The output device 4a may be connected to the first information processing device 10a with a wired cable or wirelessly.

An access point (hereinafter referred to as an "AP") 8a has wireless access point and router functions, and the first information processing device 10a connects to the AP 8a wirelessly or via a wired cable and connects to the external network 3. A camera 7a is a stereo camera and captures an image of a space around the output device 4a.

As described above, the second information processing device 10b is provided in the user's home. The second information processing device 10b connects wirelessly or wiredly to an auxiliary storage device 2b, an output device 4b, a camera 7b, and an AP 8b each of which is peripheral equipment. The connection between the second information processing device 10b and each peripheral equipment in the user's home may be carried out in the same manner as the connection between the first information processing device 10a and each peripheral equipment in the user's parents' home. In the embodiment, the second information processing device 10b is a gaming device of the same type as the first information processing device 10a, and in a case where no particular distinction is made between the first information processing device 10a and the second information processing device 10b, these devices may simply be referred to as an "information processing device 10."

Figure 2:
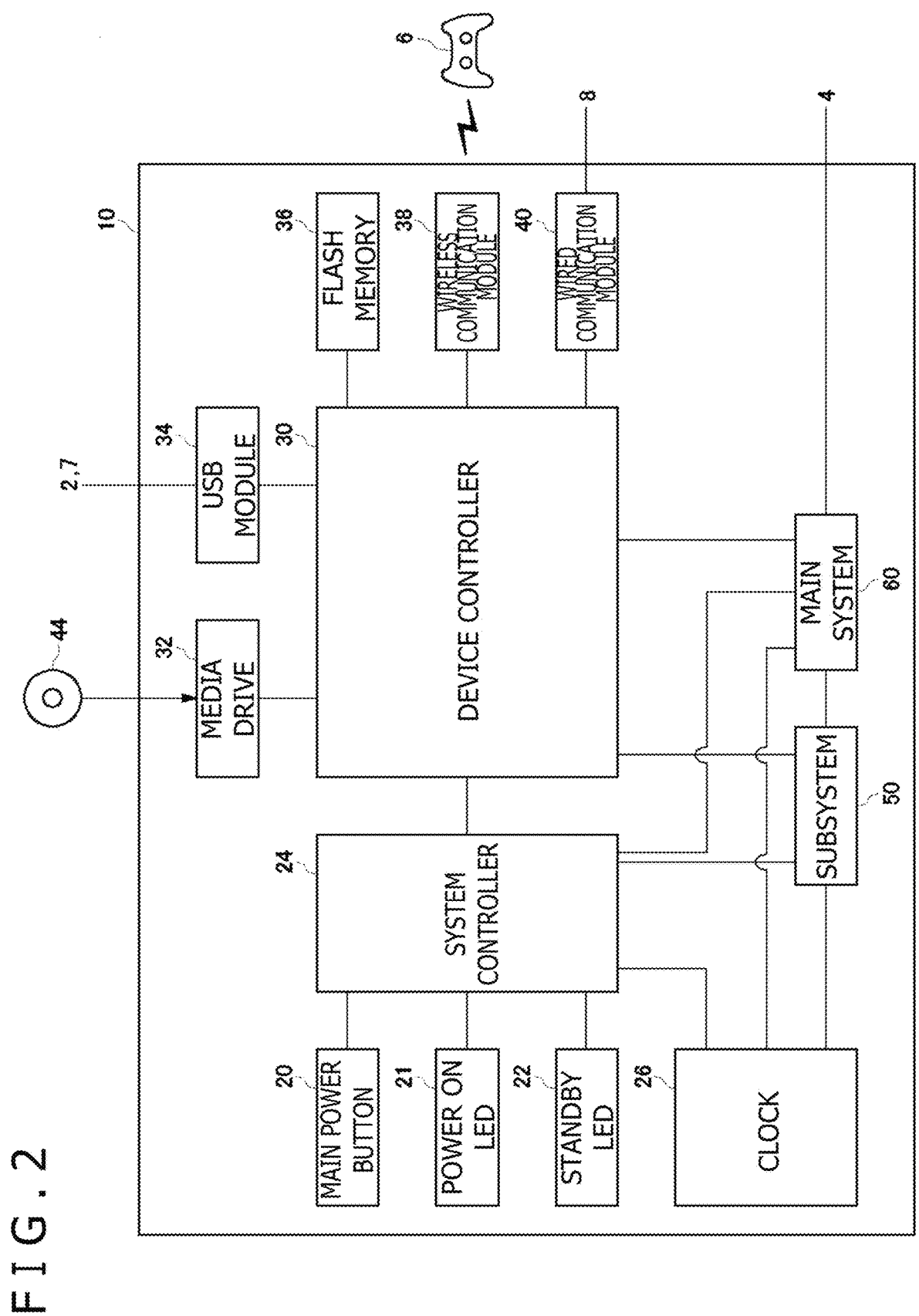
FIG. 2 is a diagram illustrating a hardware configuration of an information processing device.

FIG. 2 illustrates a hardware configuration of the information processing device 10. The information processing device 10 includes a main power button 20, a power ON LED (light-emitting diode) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main CPU (Central Processing Unit), a memory which is a main storage device, a memory controller, a GPU (Graphics Processing Unit), and the like. The GPU is used mainly to perform arithmetic operations in game programs. These functions are configured as a system on chip and formed on a single chip. The main CPU has a function of executing the game programs recorded in the auxiliary storage device 2 or a ROM (read-only memory) medium 44.

The subsystem 50 includes a sub-CPU, a memory which is a main storage device, a memory controller, and the like but does not include a GPU and does not have the function of executing the game programs. The number of circuit gate of the sub-CPU is lower than that of the main CPU, and the sub-CPU has lower operating power consumption than the main CPU.

The main power button 20 is an input section to which an operation input is made by the user, provided on a front surface of a housing of the information processing device 10, and operated to turn ON or OFF power supply to the main system 60. The power ON LED 21 lights up when the main power button 20 is switched ON, and the standby LED 22 lights up when the main power button 20 is switched OFF.

The system controller 24 detects pressing-down of the main power button 20 by the user. If the main power button 20 is pressed down when main power is OFF, the system controller 24 acquires that pressing-down operation as an "ON instruction," while, if the main power button 20 is pressed down when the main power is ON, the system controller 24 acquires that pressing-down operation as an "OFF instruction."

The clock 26 is a real-time clock, generates current date and time information, and supplies the information to the system controller 24, the subsystem 50, and the main system 60. The device controller 30 is configured as an LSI (Large-Scale Integrated Circuit) that passes information between devices as does a south bridge. As illustrated, devices such as the system controller 24, the media drive 32, the USB module 34, the flash memory 36, the wireless communication module 38, the wired communication module 40, the subsystem 50, and the main system 60, are connected to the device controller 30. The device controller 30 absorbs differences in electrical characteristics and data transfer rate between the respective devices and controls data transfer timings.

The media drive 32 is loaded with the ROM medium 44 having application software such as a game and license information recorded thereon to drive the ROM medium 44, and reads a program, data, and the like from the ROM medium 44. The ROM medium 44 may be a read-only recording medium such as an optical disc, a magneto-optical disk, a Blu-ray disc, or the like.

The USB module 34 is a module connected to external equipment with a USB cable. The USB module 34 may be connected to the auxiliary storage device 2 and the camera 7 with a USB cable. The flash memory 36 is an auxiliary storage device that is included in an internal storage. The wireless communication module 38 wirelessly communicates, for example, with the input device 6 by using a communication protocol such as Bluetooth (registered trademark) protocol or IEEE (Institute of Electrical and Electronics Engineers) 802.11 protocol. The wired communication module 40 wiredly communicates with external equipment and connects to the network 3 via the AP 8.

In the embodiment, the user logs in to the first information processing device 10a in his or her parents' home first and signs in to the management server 5. Then, the user executes an application for performing Remote Play (hereinafter referred to as a "remote app"), accesses the second information processing device 10b, and logs in to the second information processing device 10b.

Figure 3:
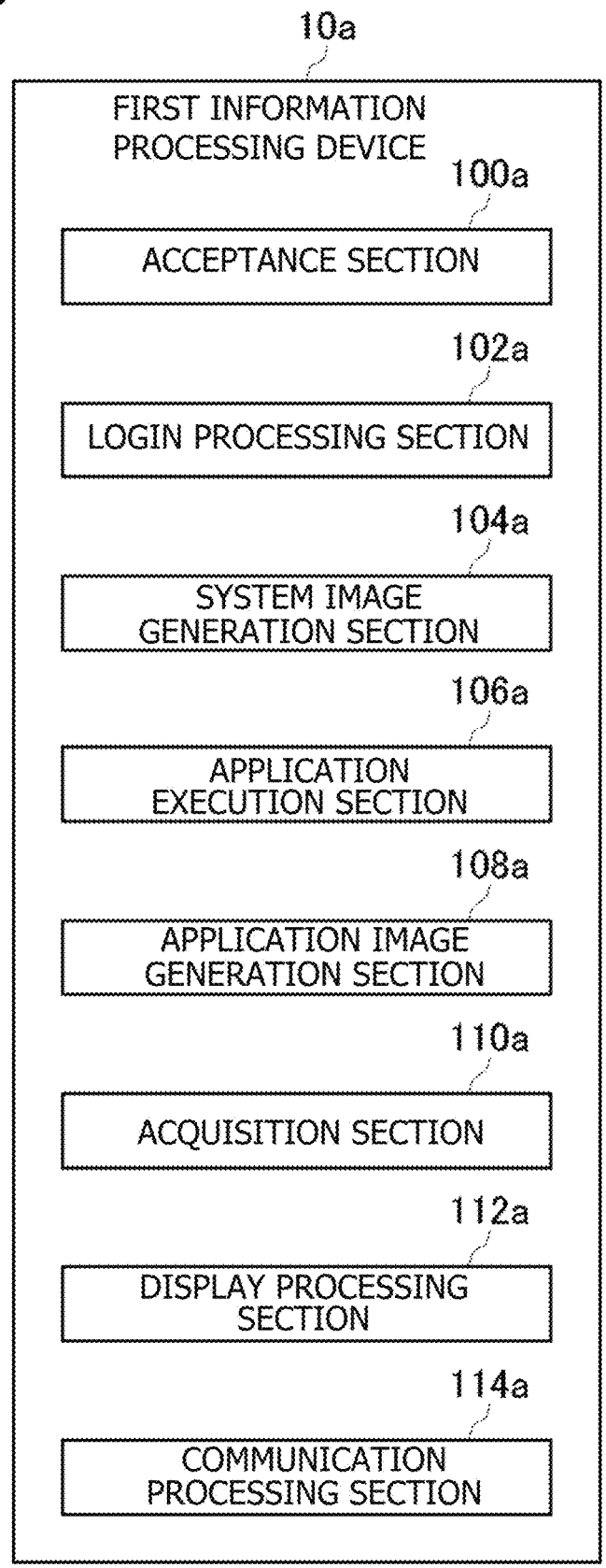
FIG. 3 is a diagram illustrating functional blocks of a first information processing device.

FIG. 3 illustrates functional blocks of the first information processing device 10a. The first information processing device 10a includes an acceptance section 100a, a login processing section 102a, a system image generation section 104a, an application execution section 106a, an application image generation section 108a, an acquisition section 110a, a display processing section 112a, and a communication processing section 114a. The communication processing section 114a illustrates the functions of the wireless communication module 38 and the wired communication module 40 illustrated in FIG. 2.

In FIG. 3, each of components described as the functional blocks that perform various processes can be configured by hardware such as a circuit block, a memory, and other LSIs or realized by software such as a program loaded into a memory. In consequence, it is to be understood by those skilled in the art that these functional blocks can be realized in various manners by hardware alone, software alone, or a combination thereof and are not limited to any one of them.

When the first information processing device 10a is started, the login processing section 102a generates a login screen and displays the screen on the output device 4a. Information regarding the users whose account information is registered with the first information processing device 10a is displayed in a list on the login screen. When the user selects his or her own user information, the acceptance section 100a accepts the selection operation of user information, and the login processing section 102a permits login of the user. In a case where a login passcode is set up, the login processing section 102a authenticates the passcode first and then permits the user's login. When the user logs in to the first information processing device 10a, account information registered with the first information processing device 10a is authenticated by the management server 5, and the user signs in to the management server 5.

Figure 4:
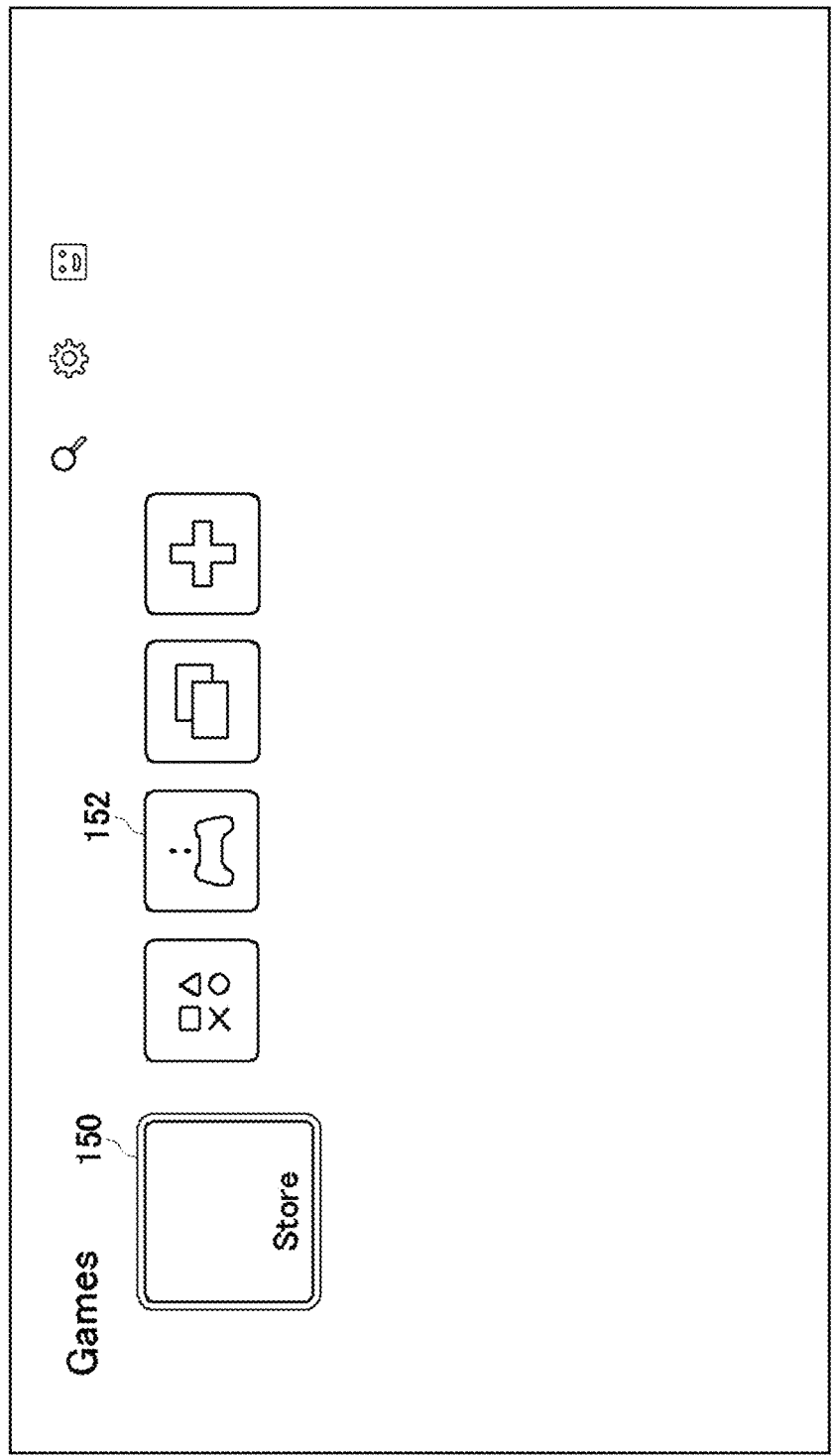
FIG. 4 is a diagram illustrating an example of a user home screen provided by the first information processing device.

FIG. 4 illustrates an example of a user home screen provided by the first information processing device 10a. When the user logs in to the first information processing device 10a, the system image generation section 104a generates home image data for the user in question, and the display processing section 112a displays a home image on the output device 4a. The system image generation section 104a is realized by system software and has a function of generating system image data for presenting menu items and the like to the user. Home image data is a type of system image data.

On the home screen, content icons such as games and applications that can be executed by the user are arranged side by side. The user operates directional keys of the input device 6, moves a row of icons horizontally, and arranges a desired content icon in a selection area 150. On the home screen illustrated in FIG. 4, a remote app icon 152 is an icon for executing a remote app.

Figure 5:
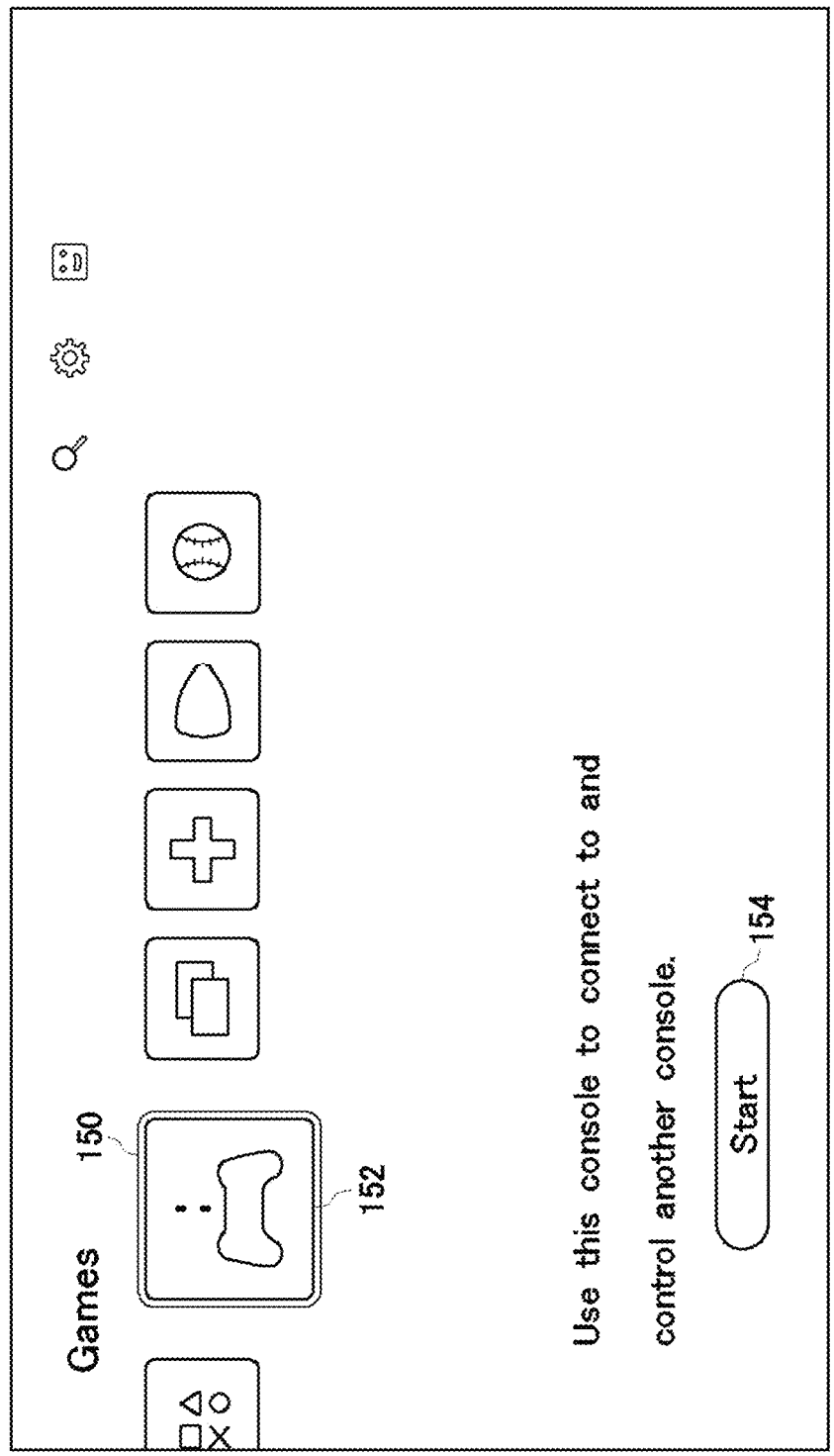
FIG. 5 is a diagram illustrating a state in which a row of icons has been moved in the home screen.

FIG. 5 illustrates a state in which a row of icons has been moved on the home screen. When the user arranges the remote app icon 152 in the selection area 150, a start button 154 for starting the remote app is displayed. When the user operates the start button 154, the application execution section 106a starts the remote app.

Figure 6:
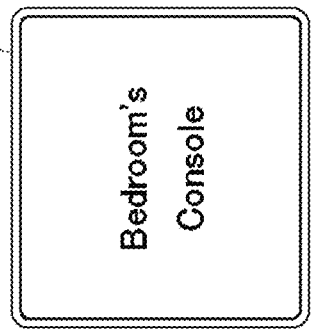
FIG. 6 is a diagram illustrating an example of a screen where a Remote Play connection destination is selected.
Figure 6:
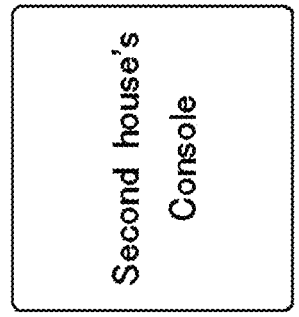

FIG. 6 illustrates an example of a screen where a Remote Play connection destination is selected. The application image generation section 108a generates a connection destination selection image, and the display processing section 112a displays the connection destination selection image on the output device 4a. Although two information processing devices, namely, "Second house's Console" and "Bedroom's Console," are displayed as connection destination options in the example illustrated in FIG. 6, the number of options may be one or three or more. The user can name consoles as desired. Here, "Second house's Console" is the information processing device provided in a user's second house, and "Bedroom's Console" is the second information processing device 10b provided in the user's home. The user operates the input device 6, moves a selection frame 156, selects "Bedroom's Console" provided in his or her home in this example, and performs a confirmation operation.

When the acceptance section 100a accepts the confirmation operation that selects "Bedroom's Console" as a connection destination, the communication processing section 114a sends a connection request to the second information processing device 10b. At this time, if the main power of the second information processing device 10b is OFF, the main system 60 of the second information processing device 10b is started on the basis of the connection request. The first information processing device 10a and the second information processing device 10b connect to each other through P2P communication via the network 3, which creates an environment that enables Remote Play.

Figure 7:
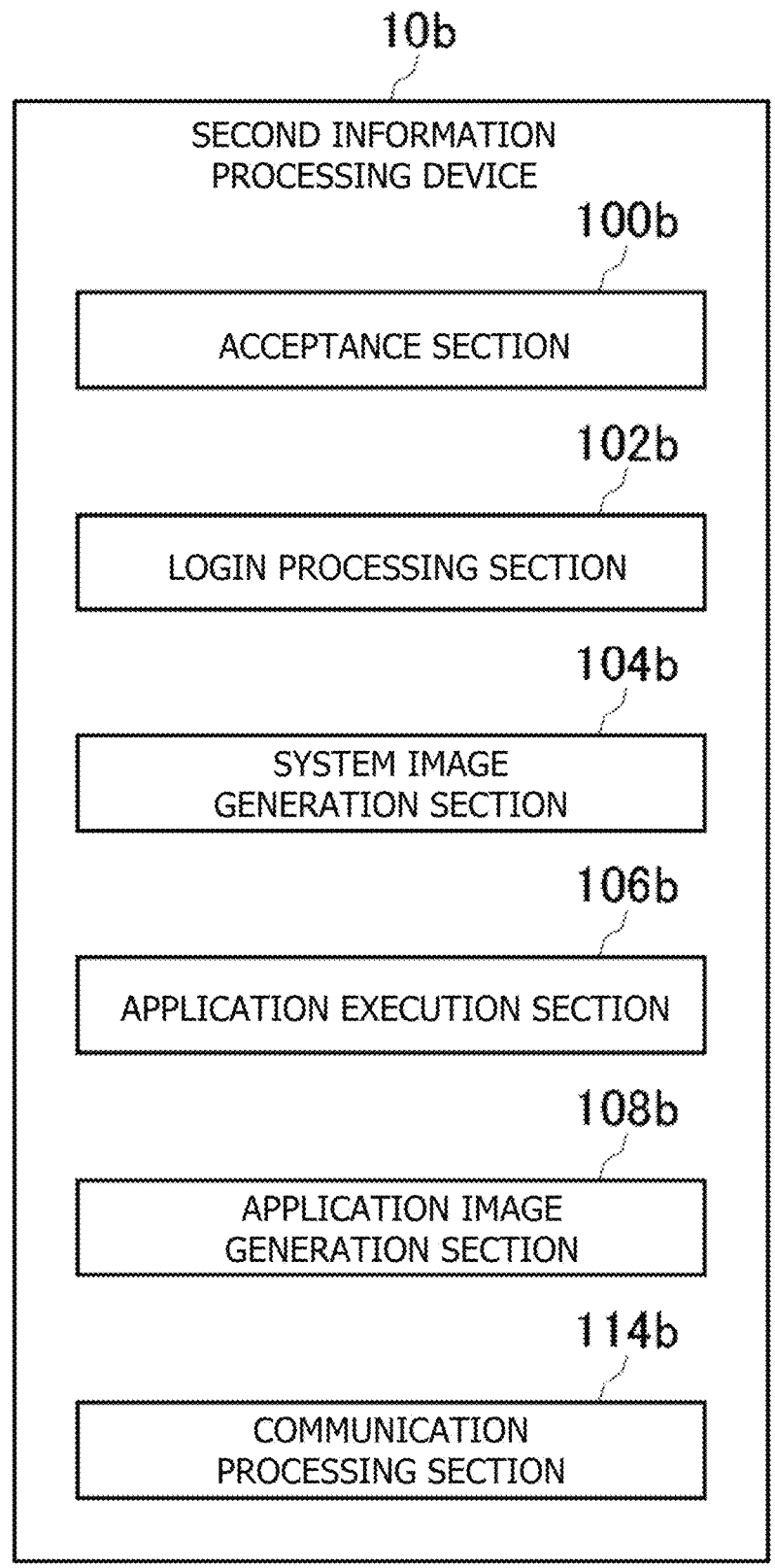
FIG. 7 is a diagram illustrating functional blocks of a second information processing device.

FIG. 7 illustrates functional blocks of the second information processing device 10b. The second information processing device 10b includes an acceptance section 100b, a login processing section 102b, a system image generation section 104b, an application execution section 106b, an application image generation section 108b, and a communication processing section 114b. The communication processing section 114b illustrates the functions of the wireless communication module 38 and the wired communication module 40 illustrated in FIG. 2.

In FIG. 7, each of components described as the functional blocks that perform various processes can be configured by hardware such as a circuit block, a memory, and other LSIs or realized by software such as a program loaded in to a memory. In consequence, it is to be understood by those skilled in the art that these functional blocks can be realized in various manners by hardware alone, software alone, or a combination thereof and are not limited to any one of them. In the embodiment, the second information processing device 10b may be a gaming device of the same type as the first information processing device 10a, and in consequence, the second information processing device 10b and the first information processing device 10a provide the same user interface to the user.

Figure 8:
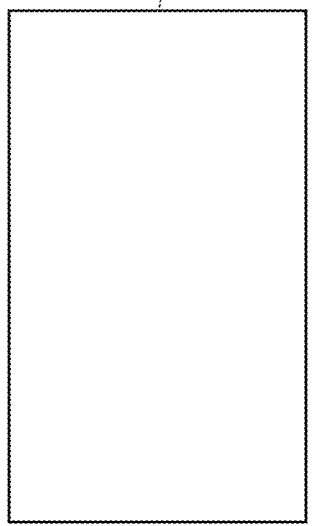
FIG. 8 is a diagram illustrating an example of a screen that is displayed when connection is established between the first information processing device and the second information processing device.

FIG. 8 illustrates an example of a screen that is displayed when connection is established between the first information processing device 10a and the second information processing device 10b. The display processing section 112a not only displays message "Connecting to your Bedroom's console" indicating that connection is being established but also sets up and displays a reduced region 160 that is smaller than a display region of the entire screen in part of the display screen. The reduced region 160 is displayed in a manner different from a screen background so as to allow the user to recognize presence of the reduced region 160.

When the communication processing section 114a and the communication processing section 114b communicatably connect to each other through P2P communication via the network 3, the remote app sends a user's login request from the communication processing section 114a to the second information processing device 10b.

In the second information processing device 10b, the communication processing section 114b receives the user's login request from the first information processing device 10a. The acceptance section 100b accepts the login request received by the communication processing section 114b and passes the login request to the login processing section 102b, and the login processing section 102b permits login of the user. As a result of the login of the user to the second information processing device 10b, the system image generation section 104b generates home image data for the user in question, and the communication processing section 114b sends the generated home image data to the first information processing device 10a.

In the first information processing device 10a, the communication processing section 114a provides the received home image data to the acquisition section 110a, and the acquisition section 110a acquires the home image data. The display processing section 112a displays a home image corresponding to the acquired home image data on the output device 4a.

Figure 9:
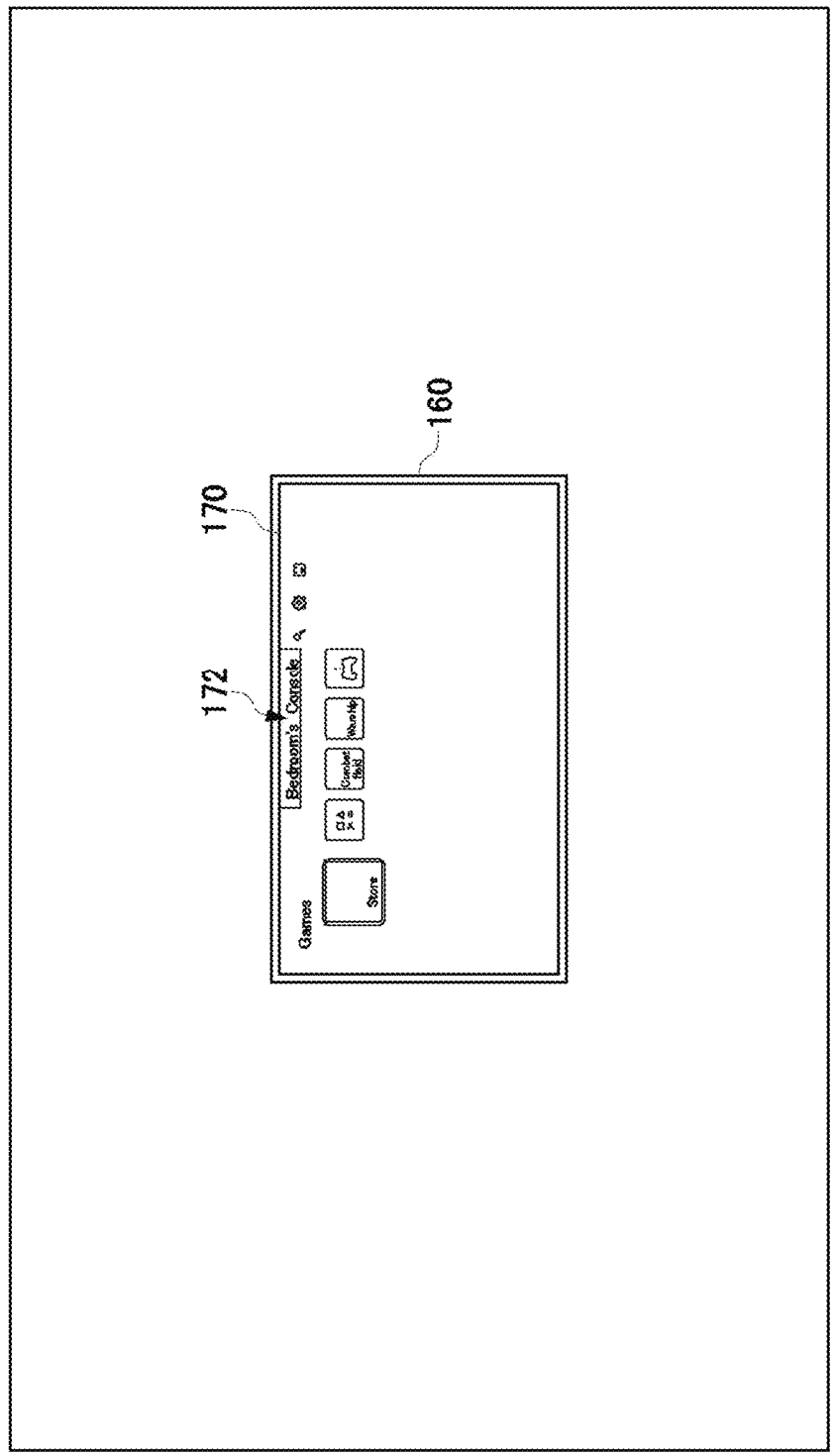
FIG. 9 is a diagram illustrating an example of a user home screen provided by the second information processing device.

FIG. 9 illustrates an example of a user home screen provided by the second information processing device 10b. When the user logs in to the second information processing device 10b, the display processing section 112a displays a home screen in the reduced region 160. This reduced region 160 is a region set up in the center of the display screen while connection is being established, and when the acquisition section 110a acquires home image data from the second information processing device 10b, the display processing section 112a displays the home image on the output device 4a in a reduced manner.

The display processing section 112a displays information indicating that the home image data has been generated by the second information processing device 10b in a manner added to the home image. The display processing section 112a displays, as the information in question, an outer frame 170 in a manner added to the home image generated by the second information processing device 10b. The outer frame 170 may be represented in a single color or in multiple colors. In any case, the outer frame 170 is added to inform that the image has been generated by an information processing device different from the first information processing device 10a that is directly operated by the user and is preferably represented in a color different from a background color.

Also, the display processing section 112a may display console information 172 of the second information processing device 10b which is the connection destination as information indicating that the home image data has been generated by the second information processing device 10b. In this example, the console information 172 is a console name given to the second information processing device 10b in question by the user, and it is possible for the user to recognize that the home image data has been generated by the second information processing device 10b by viewing the console information 172.

The display processing section 112a performs a display action that enlarges the home image displayed in the reduced region 160 over the entire display screen.

Figure 10:
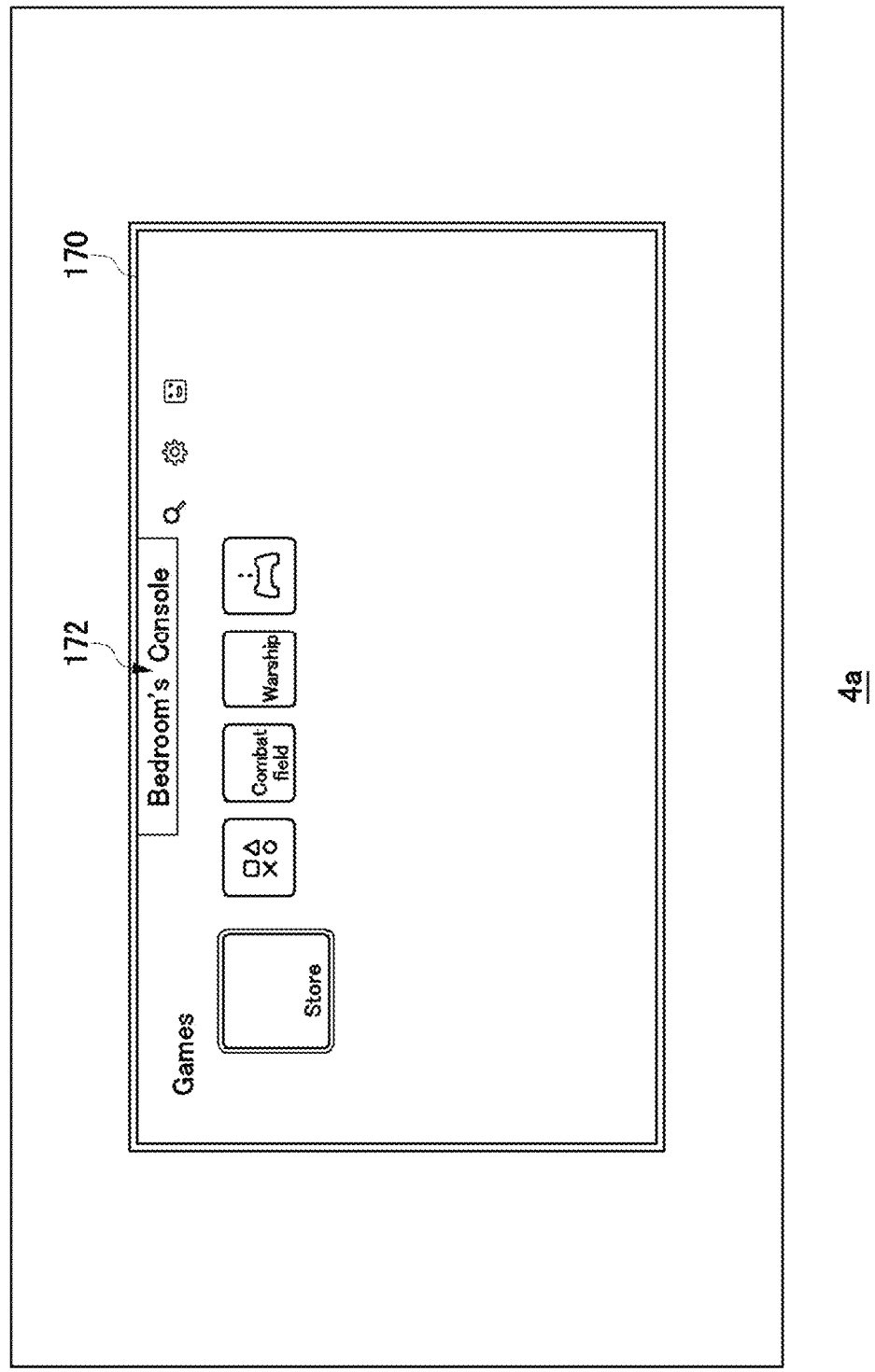
FIG. 10 is a diagram illustrating an example of a home screen being enlarged.

FIG. 10 illustrates an example of a home screen being enlarged. The display processing section 112a may enlarge and display the home image at a predetermined rate.

Figure 11:
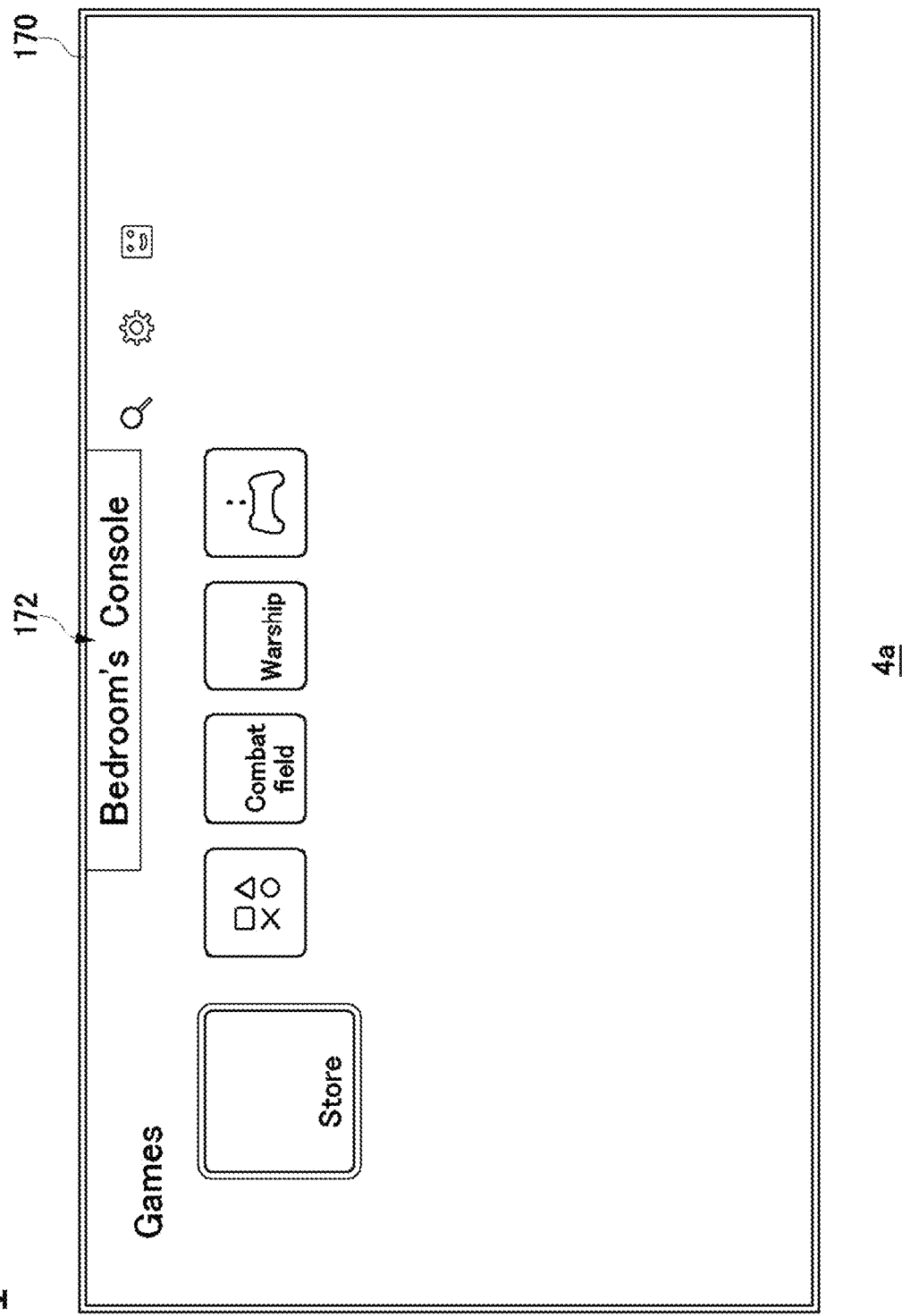
FIG. 11 is a diagram illustrating an example of a home screen displayed over an entire display screen.

FIG. 11 illustrates an example of a home screen displayed over the entire display screen. Even after the home screen is displayed over the entire display screen, the display processing section 112a continues to display the outer frame 170. This allows the user to recognize that the home screen being displayed is provided by the second information processing device 10b.

Meanwhile, the display processing section 112a may limit the display of the console information 172 to a predetermined period of time. It is expected that, because the console information 172 goes into the image, the information will become disturbing in a case where it is displayed constantly. Therefore, the display processing section 112a displays the console information 172 only for a predetermined period of time after the display of the home image begins. For example, the display processing section 112a may limit the display time of the console information 172 to a range of three to five seconds.

When the home image is displayed over the entire screen, operation information of the input device 6 of the user is basically provided to the second information processing device 10b. It should be noted that operation information of a predetermined operating member of the input device 6 is provided to the first information processing device 10a.

On the home screen provided by the second information processing device 10b, content icons such as games and applications installed in the auxiliary storage device 2b are arranged side by side. When user's operation information sent from the input device 6 is accepted while the home screen is displayed, the acceptance section 100a provides the operation information to the communication processing section 114a, and the communication processing section 114a sends the operation information to the second information processing device 10b. In the second information processing device 10b, when the communication processing section 114b receives the operation information, the acceptance section 100b provides the operation information to the system image generation section 104b.

On the home screen illustrated in FIG. 11, when the user operates a horizontal directional key of the input device 6, the system image generation section 104b generates home image data that horizontally moves the row of icons, and the communication processing section 114b sends the generated home image data to the first information processing device 10a. In the first information processing device 10a, the communication processing section 114a provides the received home image data to the acquisition section 110a, and the acquisition section 110a acquires the home image data. The display processing section 112a displays the home image corresponding to the acquired home image data on the output device 4a.

Figure 12:
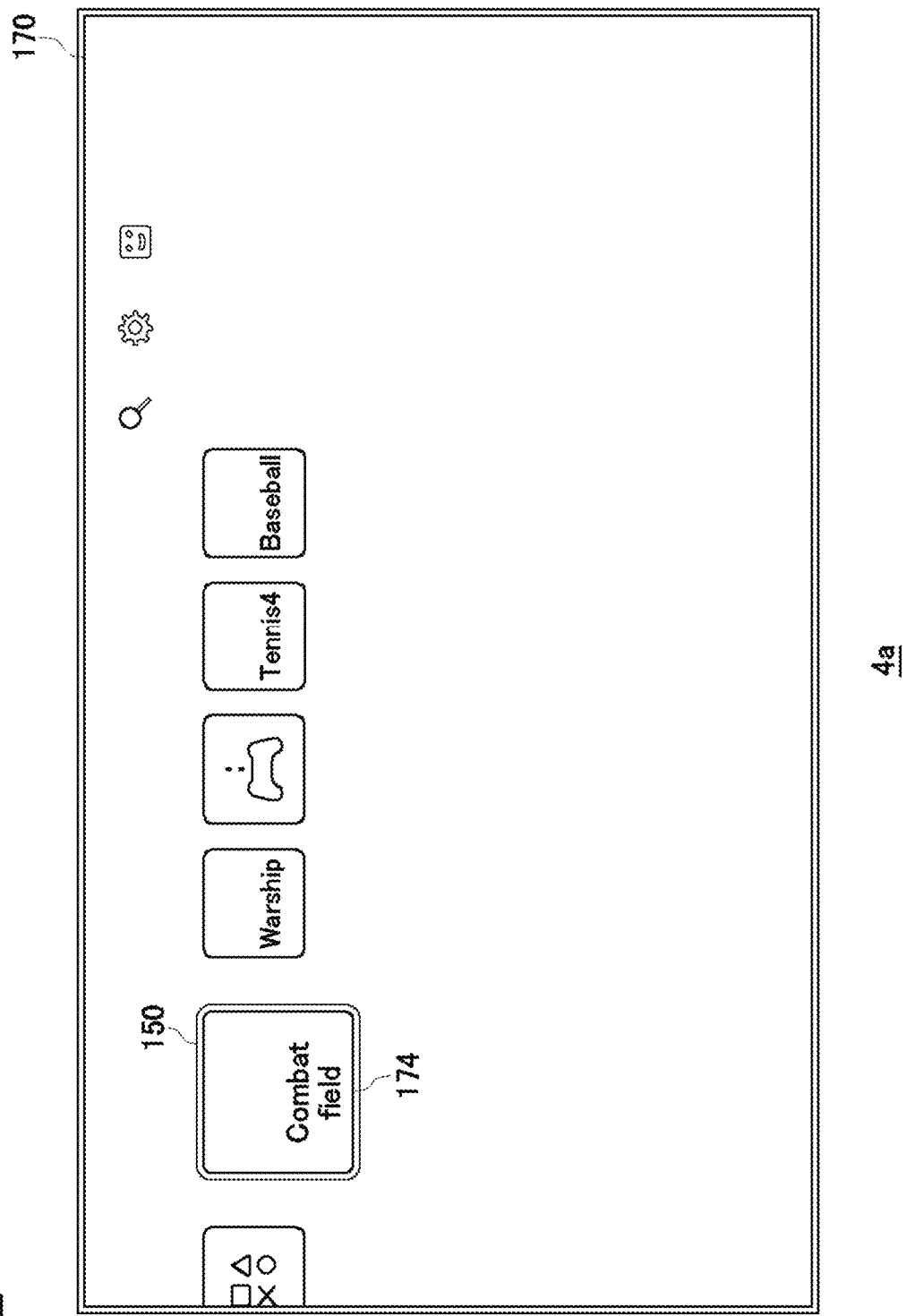
FIG. 12 is a diagram illustrating a state in which the row of icons has been moved in the home screen.

FIG. 12 illustrates a state in which the row of icons has been moved in the home screen. When the user arranges a game icon 174 in the selection area 150 and operates a predetermined execution button of the input device 6, the application execution section 106b starts a game titled "Combat field," and the application image generation section 108b generates game image data. The application image generation section 108b includes a GPU (Graphics Processing Unit) that performs a rendering process and the like and generates game image data from a viewpoint position in a virtual space (virtual camera) in response to arithmetic operation results in the virtual space by the application execution section 106b. It should be noted that, although an application sound generation section (not illustrated) generates game sound data at the same time, description of the game sound data will be omitted below.

The communication processing section 114b streams the game image data to the first information processing device 10a. In the first information processing device 10a, the acquisition section 110a acquires the game image data, and the display processing section 112a displays the game image corresponding to the game image data on the output device 4a.

Figure 13:
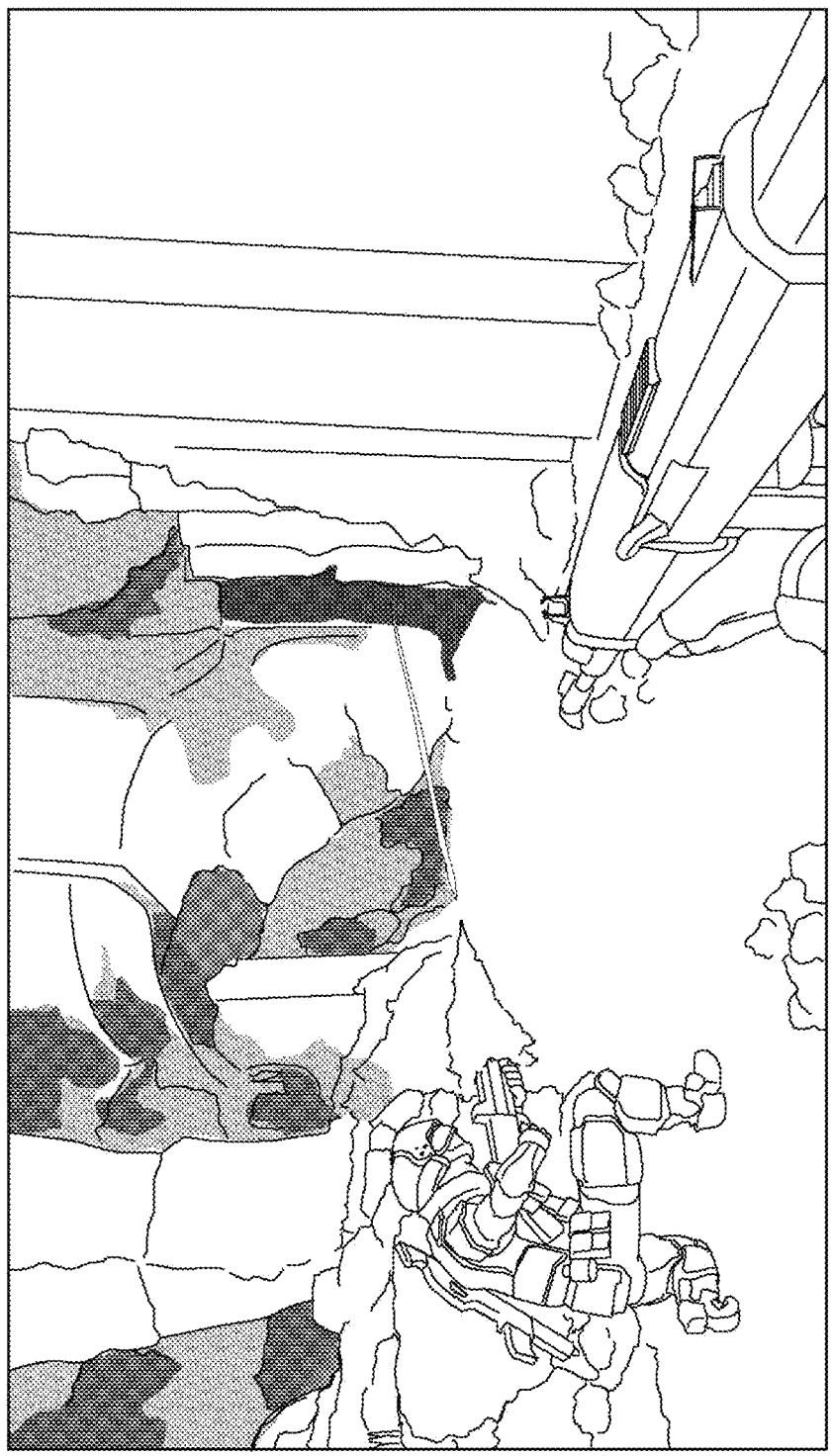
FIG. 13 is a diagram illustrating an example of a game screen played remotely by the user.

FIG. 13 illustrates an example of a game screen played remotely by the user. In this example, the user plays "Combat field" executed by the second information processing device 10b, and the display processing section 112a displays the game image corresponding to game image data sent from the second information processing device 10b. It should be noted that the display processing section 112a does not add, to a game image, information indicating that game image data has been generated by the second information processing device 10b when displaying the game image. As illustrated in FIG. 13, the outer frame 170 and the console information 172 are not added to the game image, which makes it possible for the user to play the game without caring about the outer frame 170 and the console information 172.

As described above, operation information of the input device 6 is basically sent to the second information processing device 10b and processed during Remote Play. However, functions for operating the first information processing device 10a are assigned to some of the operating members of the input device 6, and it is possible for the user to display a system image of the first information processing device 10a by operating the operating members in question during Remote Play.

Figure 14:
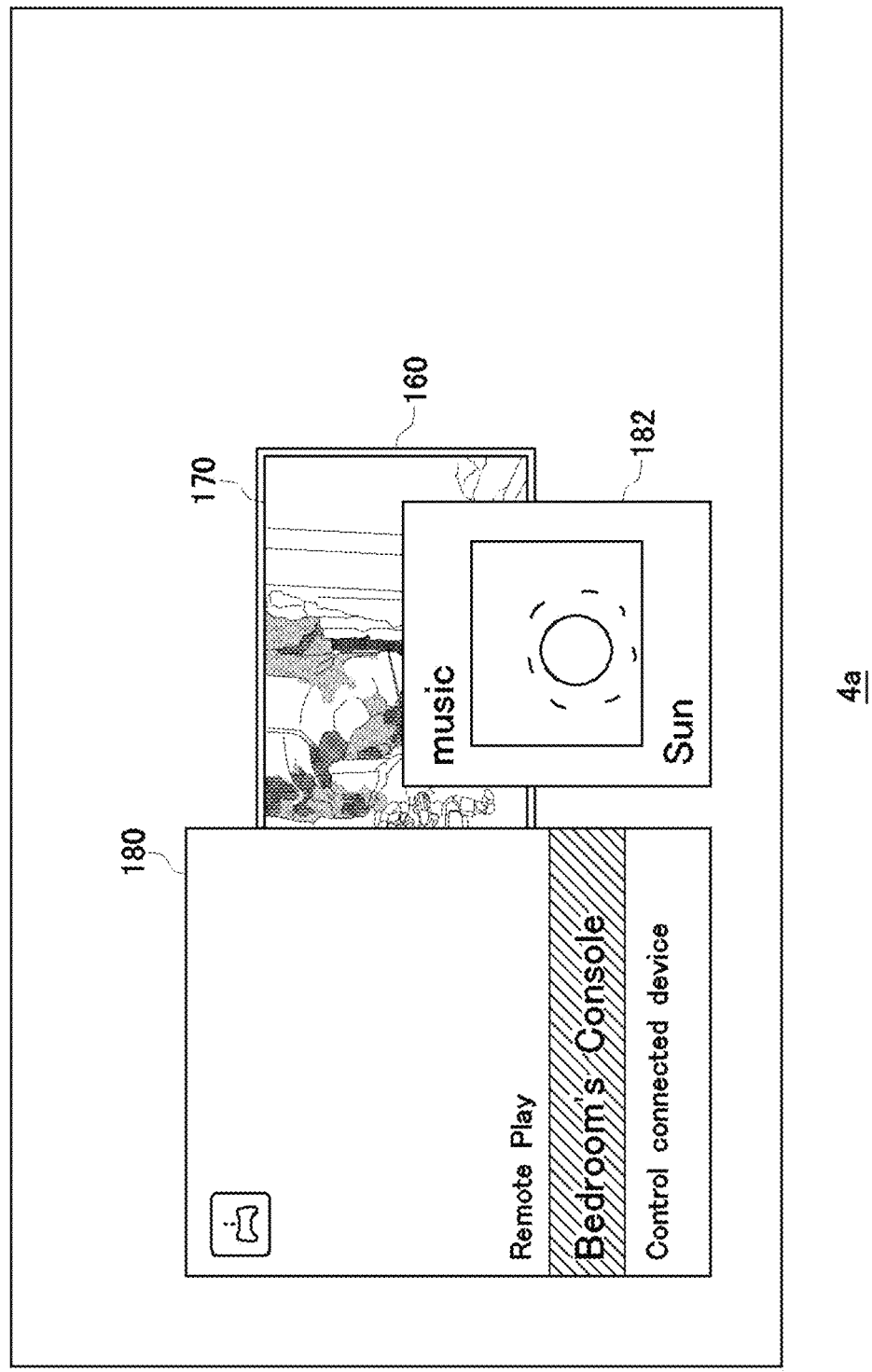
FIG. 14 is a diagram illustrating an example of a screen displayed when the user operates a predetermined operating member.

FIG. 14 illustrates an example of a screen displayed when the user operates a predetermined operating member. While Remote Play is in execution, the functions for operating the first information processing device 10a are assigned to some of the operating members of the input device 6, and when operation information of the operating members in question is received, the acceptance section 100a supplies the operation information to the system image generation section 104a. The system image generation section 104a generates system image data corresponding to the operation information accepted by the acceptance section 100a, and the display processing section 112a displays system images 180 and 182 corresponding to the system image data on the output device 4a.

The system images 180 and 182 are GUIs (Graphical User Interfaces) for notifying the user of information regarding active applications on the first information processing device 10a and information that is estimated to be high in priority for the user. The system image generation section 104a generates, for each unit of information, a GUI in a card-like shape that includes part of the information. Here, the system image 180 is a GUI regarding Remote Play being executed, and the system image 182 is a GUI regarding music in which the user is interested. It should be noted that the system image generation section 104a may generate three or more pieces of system image data.

The display processing section 112a reduces the game image displayed over the entire screen and displays the system images 180 and 182 in a manner superimposed on the reduced game image. Thus, the display processing section 112a not only displays the game image in a reduced manner but also uses the game image as a background image when displaying the system images 180 and 182 while the game image is being displayed, which makes it easier for the user to recognize that the system images 180 and 182 have been generated by the first information processing device 10a. Also, the display processing section 112a reduces the game image to the same size as the reduced region 160, which makes it easier for the user to recognize that the reduced game image has been generated by the second information processing device 10b.

At this time, the display processing section 112a adds the outer frame 170 to the game image displayed in a reduced manner. By adding the outer frame 170 to the reduced game image, it becomes even easier for the user to recognize that the game image displayed in a reduced manner has been generated by the second information processing device 10b. The system images 180 and 182 become active and can be operated by the user when displayed in foreground, and operation information of the input device 6 is processed by the first information processing device 10a.

When the user performs the confirmation operation with "Bedroom's Console" selected in the system image 180, the system image generation section 104a generates system image data for operating the second information processing device 10b through Remote Play, and the display processing section 112a displays a system image corresponding to the system image data on the output device 4a.

Figure 15:
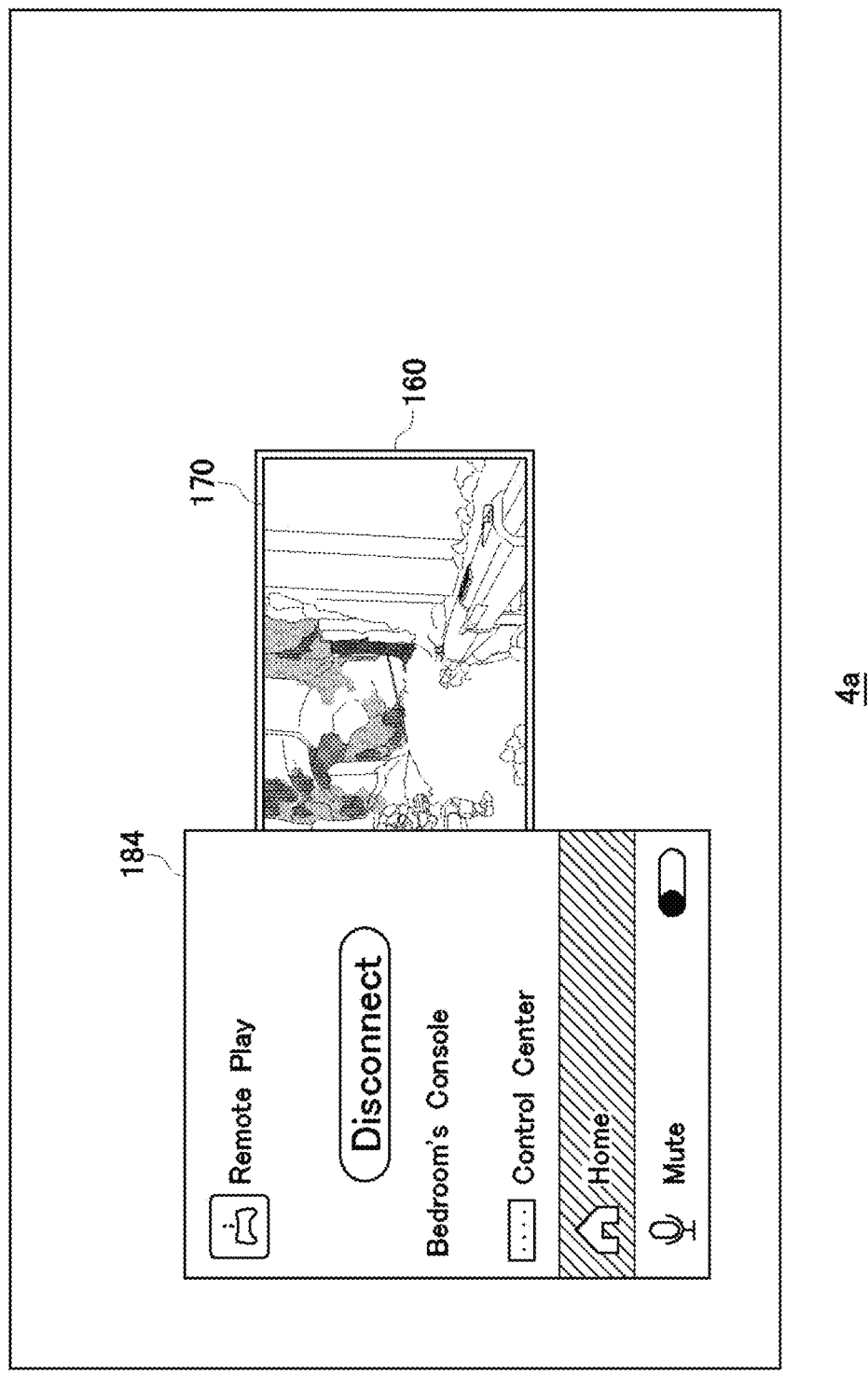
FIG. 15 illustrates an example of a system screen provided by the first information processing device.

FIG. 15 illustrates an example of a system screen provided by the first information processing device 10a. A system image 184 is generated by the first information processing device 10a and is displayed in foreground relative to the game image displayed in a reduced manner. In the system image 184 illustrated in FIG. 15, an item "Home" is selected.

In the system image 184, when the user selects "Home" and performs the confirmation operation, the communication processing section 114a sends a request to generate home image data to the second information processing device 10b. In the second information processing device 10b, when the acceptance section 100b accepts the request to generate home image data, the system image generation section 104b generates home image data for the user in question, and the communication processing section 114b sends the generated home image data to the first information processing device 10a.

In the first information processing device 10a, the communication processing section 114a provides the received home image data to the acquisition section 110a, and the acquisition section 110a acquires the home image data. The display processing section 112a displays a home image corresponding to the acquired home image data on the output device 4a. At this time, after displaying the home image in the reduced region 160 as illustrated in FIG. 9, the display processing section 112a performs a display action that gradually enlarges the home image (refer to FIG. 10) and that eventually displays the home image over the entire screen (refer to FIG. 11).

Figure 16:
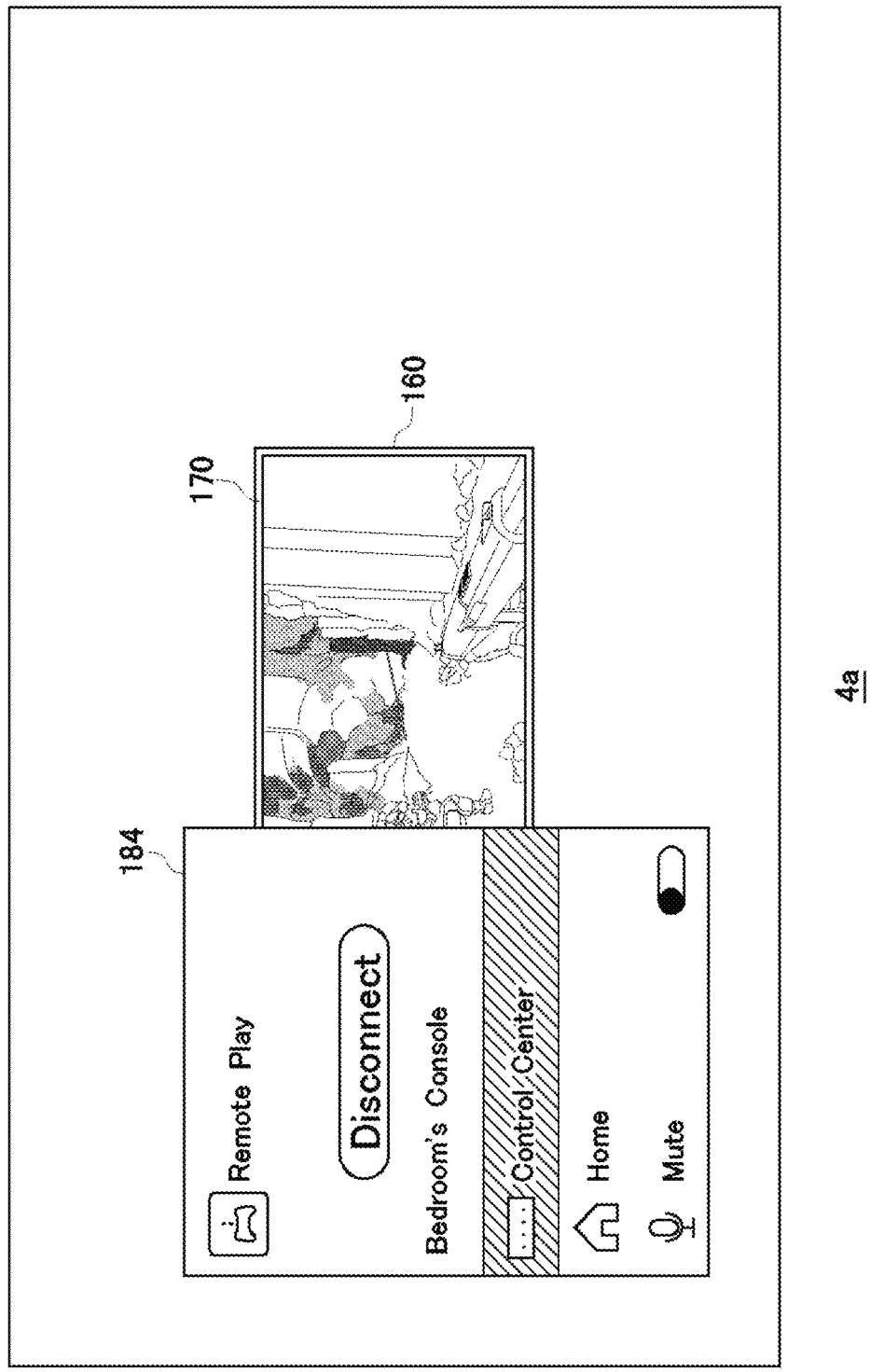
FIG. 16 illustrates an example of a system screen provided by the first information processing device.

FIG. 16 illustrates an example of a system screen provided by the first information processing device 10a. In the system image 184 illustrated in FIG. 16, an item "Control Center" is selected. In the system image 184, when the user selects "Control Center" and performs the confirmation operation, the communication processing section 114a sends a request to generate system image data to the second information processing device 10b. In the second information processing device 10b, when the acceptance section 100b accepts the request to generate system image data, the system image generation section 104b generates system image data for the user in question, and the communication processing section 114b sends the generated system image data to the first information processing device 10a. System image data is GUI (Graphical User Interface) data for notifying the user of information regarding active applications on the second information processing device 10b and information that is estimated to be high in priority for the user.

Figure 17:
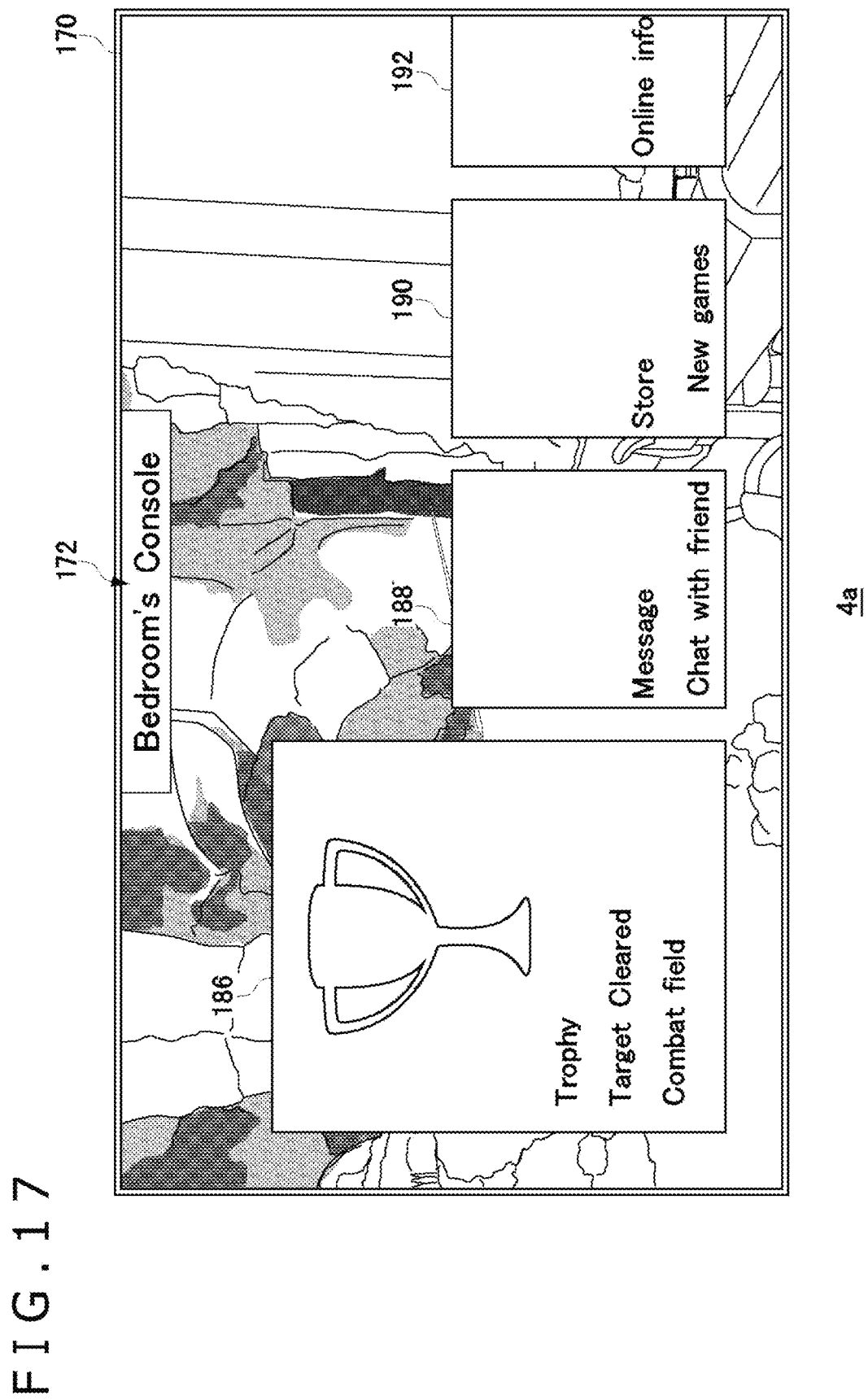
FIG. 17 illustrates an example of a system screen provided by the second information processing device.

FIG. 17 illustrates an example of a system screen provided by the second information processing device 10b. In the first information processing device 10a, the communication processing section 114a provides the system image data received from the second information processing device 10b to the acquisition section 110a, and the acquisition section 110a acquires system image data. The display processing section 112a displays system images 186, 188, 190, and 192 corresponding to the acquired system image data on the output device 4a. At this time, after displaying the system images 186, 188, 190, and 192 in the reduced region 160 as illustrated in FIG. 9, the display processing section 112a performs a display action that gradually enlarges the system images 186, 188, 190, and 192 and that eventually displays them over the entire screen.

At this time, the display processing section 112a displays the outer frame 170 and the console information 172 as information indicating that the system image data has been generated in the second information processing device 10b. It should be noted that the console information 172 need only display a predetermined period of time.

The system images 186, 188, 190, and 192 are GUIs (Graphical User Interfaces) for notifying the user of information regarding active applications on the second information processing device 10b and information that is estimated to be high in priority for the user. The system image generation section 104b generates, for each unit of information, a GUI in a card-like shape that includes part of the information. Here, the system image 186 is a GUI regarding the game titled "Combat field," the system image 188 is a GUI regarding a message from a friend, the system image 190 is a GUI regarding a new game in which the user is interested, and the system image 190 is a GUI regarding an on-line friend. When the user selects any one of the GUIs, detailed information regarding the GUI in question may be presented.

A description has been given above of the present disclosure on the basis of the embodiment. It should be understood by those skilled in the art that the embodiment is illustrative, that various modification examples are possible in combinations of the components and processes, and that such modification examples also fall under the scope of the present disclosure.

INDUSTRIAL APPLICABILITY

The present disclosure is applicable to a technology that displays an image.

REFERENCE SIGNS LIST

1: Information processing system
4a: Output device
6: Input device
10a: First information processing device
10b: Second information processing device
100a, 100b: Acceptance section
102a, 102b: Login processing section
104a, 104b: System image generation section
106a, 106b: Application execution section
108a, 108b: Application image generation section
110a: Acquisition section
112a: Display processing section
114a, 114b: Communication processing section

The invention claimed is:

1. An information processing device operated by a user, comprising:
   a communication processing section configured to communicatably connect to another information processing device via a network;
   an acquisition section configured to acquire first image data from the other information processing device;
   a display processing section configured to display a first image corresponding to the first image data acquired by the acquisition section;
   an acceptance section configured to accept operation information of an input device for operating the information processing device when the first image is displayed; and
   an image generation section configured to generate second image data corresponding to the operation information accepted by the acceptance section, wherein
   the display processing section reduces the first image and displays a second image corresponding to the second image data in a manner superimposed on the reduced first image.

2. The information processing device according to claim 1, wherein the display processing section displays information indicating that the first image data has been generated by the other information processing device in a manner added to the first image.

3. The information processing device according to claim 2, wherein the display processing section displays, as the information, an outer frame in a manner added to the first image.

4. The information processing device according to claim 1, wherein, when the communication processing section establishes connection with the other information processing device, the display processing section performs a display action that sets up a reduced region in part of a display screen, that displays the first image in the reduced region in question after connection is established, and that enlarges the first image in question over the entire display screen.

5. An image display method that displays images on an information processing device, the image display method comprising:
- acquiring first image data from another information processing device to which the information processing device communicatably connects via a network;
- displaying a first image corresponding to the first image data;
- accepting operation information of an input device for operating the information processing device when the first image is displayed;
- generating second image data corresponding to the operation information; and
- reducing the first image and displaying a second image corresponding to the second image data in a manner superimposed on the reduced first image.

6. A non-transitory, computer readable storage medium containing a computer program, which when executed by a computer, causes the computer to perform an image display method that displays images on an information processing device by carrying out actions, compmrising:
- acquiring first image data from an information processing device to be communicatably connected via a network;
- displaying a first image corresponding to the first image data;
- accepting operation information of an input device for operating the computer when the first image is displayed;
- generating second image data corresponding to the operation information; and
- reducing the first image and displaying a second image corresponding to the second image data in a manner superimposed on the reduced first image.

* * * * *